United States Patent [19]
Taylor et al.

[11] Patent Number: 4,907,490
[45] Date of Patent: Mar. 13, 1990

[54] VEHICLE CLIMATE CONTROL APPARATUS

[75] Inventors: David W. Taylor, Goodrich; Benjamin H. Baker, Davison, both of Mich.

[73] Assignee: Cirtek Corporation, Flint, Mich.

[21] Appl. No.: 256,966

[22] Filed: Oct. 13, 1988

[51] Int. Cl.$^4$ .............................................. F15B 21/02
[52] U.S. Cl. ........................................ 91/36; 91/356; 137/625.65; 251/129.04
[58] Field of Search .................... 91/36, 356, 357; 137/353, 625.65; 251/129.04, 129.11; 165/42, 43; 98/2

[56] References Cited

U.S. PATENT DOCUMENTS

| | | | |
|---|---|---|---|
| 3,983,930 | 10/1976 | Franz | 165/42 X |
| 4,346,729 | 8/1982 | Franz | 165/42 |
| 4,408,278 | 10/1983 | Saito et al. | 165/42 X |
| 4,679,588 | 7/1987 | Raab et al. | 137/353 X |
| 4,736,670 | 4/1988 | Czarnecki | 91/36 |

Primary Examiner—Harold Joyce
Attorney, Agent, or Firm—Learman & McCulloch

[57] ABSTRACT

Apparatus for controlling a vehicle climate control system having pneumatic passages provided with doors or baffles to regulate the flow of conditioned air to the passenger compartment. The passage or passages are selected by positioning a valve that couples a pneumatic source to one or more of the door or baffle operators. The position of the valve is determined by an electric motor that has applied thereto an energizing voltage from a control bridge circuit which also has applied thereto a feedback voltage which changes in response to operation of the motor. Movement of the valve to a selected position causes the feedback voltage to equal the energizing voltage, whereupon the motor is deenergized and movement of the valve terminates.

17 Claims, 2 Drawing Sheets 4,907,490

VEHICLE CLIMATE CONTROL APPARATUS

This invention relates generally to pneumatically operated apparatus for controlling automative heating, air conditioning, and ventilation systems commonly referred to as climate control systems.

BACKGROUND OF THE INVENTION

Climate control systems in automobiles are well known and typically include one or more devices such as a heater, air conditioner, and windshield defroster, and a plurality of pneumatic pathways or passages for delivering conditioned air into the passenger compartment. As used herein, "conditioned air" refers to air that deliberately has been treated for purposes of obtaining or maintaining a desired climate in the automobile, and can include heating, cooling, or the introduction of outside ambient air into the passenger compartment. For example, depending upon which pneumatic passage is used, conditioned air can be directed towards the compartment floor, at mid-level of the compartment, against the windshield, or various combinations thereof.

Controlling the flow of air through such pneumatic passages to a desired output typically is accomplished by means of adjustable doors or baffles. The doors or baffles are adjusted in response to actuators that conventionally are controlled by manual slide lever activators or electrical solenoids. Such actuators are objectionable because they are noisy, often difficult to operate, and do not always effect an efficient coupling of the pneumatic source to the selected door or baffle.

Electrical motors are more desirable, because they are quiet, consistent and reliable. Unfortunately, such motors are also relatively expensive, particularly when many such motors must be provided in a single system. Vacuum motors normally are less expensive, but tend to be noisier, less reliable, and often do not provide the user with control mechanisms that have consistent operating feel and performance.

A need exists for a pneumatic door or baffle control apparatus for use in an automobile climate control system that offers the relative economy of vacuum driven motors and the relative quiet and reliability of electrical motors. An object of this invention is to fulfill such need.

SUMMARY OF THE INVENTION

The pneumatic control apparatus disclosed herein is adapted for use in an automobile having a plurality of pneumatic passages, one or more devices for conditioning air, and operating means for controlling the flow of air from the selected conditioning air device through a pneumatic passage network to the desired outlet or outlets into the passenger compartment. In the disclosed embodiment, the control apparatus includes an electrical drive motor operable to control a plurality of vacuum responsive switching mechanisms which effect movement of doors or baffles to select the desired passage through which conditioned air is delivered to the passenger compartment.

The control apparatus includes an input switch network for enabling an operator to select a desired conditioned air option and the flow path of air through the passageways. Alternatively, the operator can be given a choice of conditioning options, with each conditioning option having an associated air flow path automatically selected in conjunction with that option. The control apparatus also includes a motor having a geared drive transmission coupled to a control valve that is operable to establish the selected air flow path. In the preferred embodiment, the motor is reversible thereby enabling the drive transmission to move in either of two opposite directions.

The apparatus also includes a carrier assembly coupled to the drive transmission so that energization of the drive motor will cause the carrier assembly also to be driven. The carrier assembly not only effects operation of the control valve that interacts with the pneumatic passages that are connected to the various vacuum responsive switching mechanisms of the climate control system, but also is coupled to a movable contactor in a feedback circuit that is movable with the control valve to positions related to which ones of the pneumatic ports are coupled by the valve. In one embodiment, the contactor interacts with each of a plurality of conductive pads or taps of a resistor ladder carried by a substrate, thereby enabling the engaged pad and the resistors associated therewith to be electrically coupled to the motor control circuit.

Finally, the control apparatus includes a control bridge circuit coupled to the input switch network and the movable contactor, and provides appropriate control signals to the motor to cause the motor to move the carrier assembly, the control valve, and the movable contactor to positions that correspond to a selected conditioned air flow. In the preferred embodiment, the bridge circuit includes two comparators, the outputs of which provide power to the motor so that the energized state of the motor and the direction of its rotation when energized are functions of the outputs of the two comparators.

THE DRAWINGS

DETAILED DESCRIPTION

Figure 1:
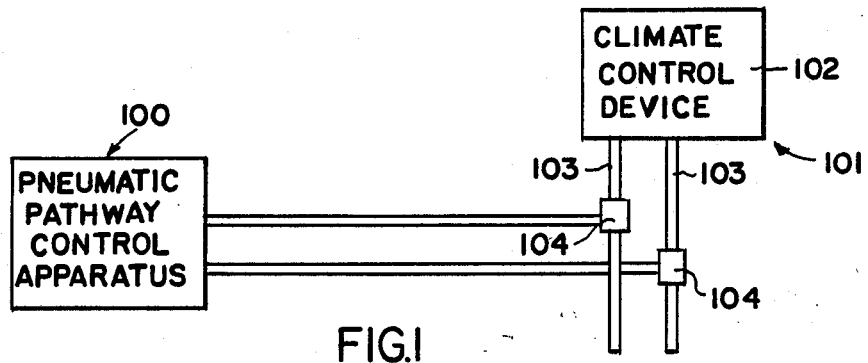
FIG. 1 is a block diagram depiction of the invention as used in an automobile climate control system.

Control apparatus constructed in accordance with the presently preferred embodiment of the invention is designated generally by the reference character 100. The apparatus 100 operates in conjunction with an automotive climate control system 101 which includes one or more climate control devices 102 for conditioning air, a plurality of pneumatic pathways or passages 103, and operating devices 104 for controlling which of the passages are used to effect delivery of conditioned air from the climate control device 102 to the passenger compartment of the automobile. In this embodiment, the operating devices 104 are vacuum responsive and provide pneumatic control signals to doors or baffles (not shown) to produce the desired air flow pattern through the pneumatic passages.

Figure 2:
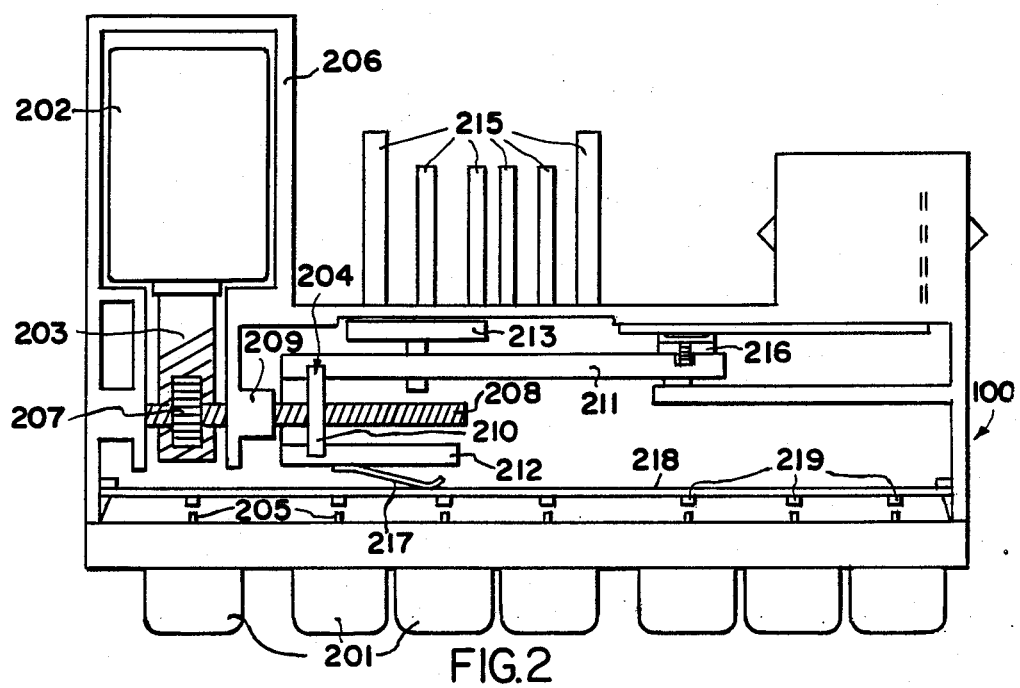
FIG. 2 is a top plan view of the invention.

The apparatus 100 as shown in FIG. 2 includes a plurality of input devices 201, a reversible DC motor 202, a driving worm gear 203, a carrier assembly 204, and a control circuit (described below in more detail with respect to FIG. 4).

Each input device 201 includes a normally open, spring biased pushbutton of conventional construction.

These buttons have appropriate legends and function indicators provided on their front panel as appropriate to the particular application. For example, one button (the lefthand button in FIG. 2) may bear the legend "off" and the remaining six buttons may bear legends such as "AC", "MAX AC", "VENT", "FLOOR", "FLOOR/DEF", and "DEF". The buttons are spring biased outwardly, so that the operator must act against the bias to move the buttons inwardly, and so that each button will return to its original open position when the actuating force is released. Each button also can have a tab 205 associated therewith that moves with the button to contact an electrical input switch 219 mounted on an appropriate circuit substrate 218. Such buttons are well known in the art and need no further description.

The motor 202 comprises a conventional DC, permanent magnet motor. Such a motor has two power leads and an armature shaft that is rotatable clockwise or counterclockwise, depending upon the polarity of the bias applied to the power leads. The motor 202 is mounted within a housing 206 that may be supported in any convenienr position within the vehicle.

The carrier assembly 204 is coupled to the drive motor via a drive transmission which includes a gear 207 in mesh with the worm gear 203, a threaded shaft 208 fixed to the gear 207, a bearing holder 209 formed as part of the housing 206, and a carrier plate 210 having a threaded opening through which the threaded shaft 208 extends so as to impart movements to the carrier assembly in response to rotation of the motor. The carrier assembly 204 also includes spaced, parallel side members 211 and 212 that are joined to opposite ends of the carrier plate 210. The side member 211 supports a control valve 213 for interconnecting selected ones of a plurality of pneumatic ports 215, one of which is connected to a vacuum source and the others of which are connected to the conditioned air doors or baffles referred to above.

In general, the valve 213 comprises a manifold plate that opens or occludes the various pneumatic ports 215 in order to effectuate control over the doors or baffles.

The side member 211 of the carrier 204 also supports a power feed assembly 216 that provides electrical power to the devices for conditioning air in a manner that will be described in more detail below.

The side member 212 carries a conductive slide 217 that projects toward a substrate 218 on which conductive circuitry is mounted for engagement by the slide, as will be explained more fully below. From the foregoing, it will be understood that rotation of the armature shaft of the motor 202 will effect conjoint movement of the carrier assembly 204, the valve 213, the feed assembly 216, and the slide 217.

Figure 3:
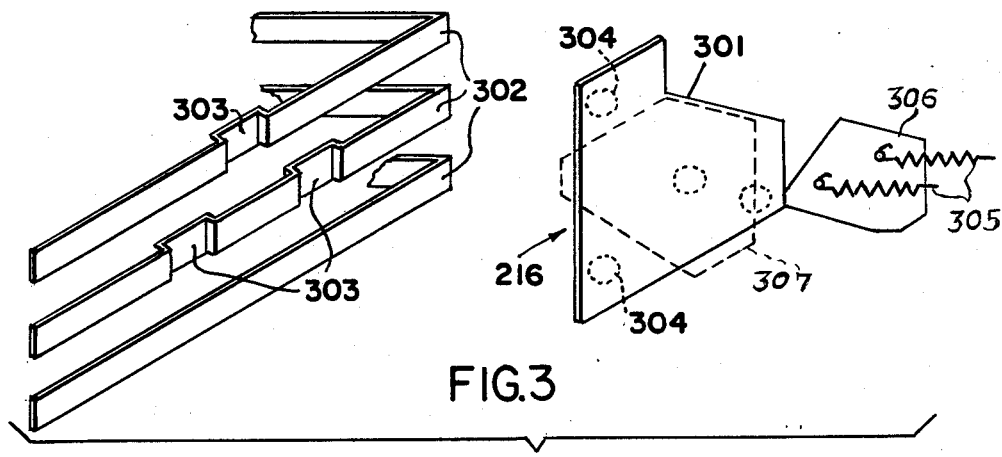
FIG. 3 is an enlarged, exploded, perspective view of certain electrical components incorporated in the invention.

Additional details of the power feed assembly 216 are shown in FIG. 3. The assembly includes a contact plate 301 carried by the carrier side member 211 and a group of three conductive strips 302 supported by the housing. The strips 302 are electrically isolated from one another and the upper two include recessed areas 303 as shown. The two upper strips 302 are connected to high current devices such as an air conditioner compressor clutch, a blower motor via a source of electrical energy, whereas the lower strip 302 is grounded. The contact plate 301 has projections 304 thereon arranged to bear upon the respective strips. The plate 301 is urged toward the strips 302 by springs 305 accommodated in openings in the side member 211 and exert a biasing force on the plate 301 via a bearing plate 306 that is fixed to the plate 301 by means of an adhesive overlay 307. By moving the contact plate 301 laterally with respect to the conductive strips 302 (the latter being fixed), the projections 304 can be brought into contact with various ones of the conductive strips 303 to enable various connections to be made to the high current loads.

For example, if one of the upper conductive strips 302 is connected to a power source (such as the vehicle battery) and an air conditioner, and if the center conductive strip is connected to a blower, positioning the contact plate 301 to cause the conductive projections 304 to bridge all three conductive strips would effect energization of the blower and the air conditioning unit. Hence, operation of the conditioning air units may be controlled by movement of the carrier assembly in conjunction with control of the pneumatic passages via the valve 213.

Figure 4:
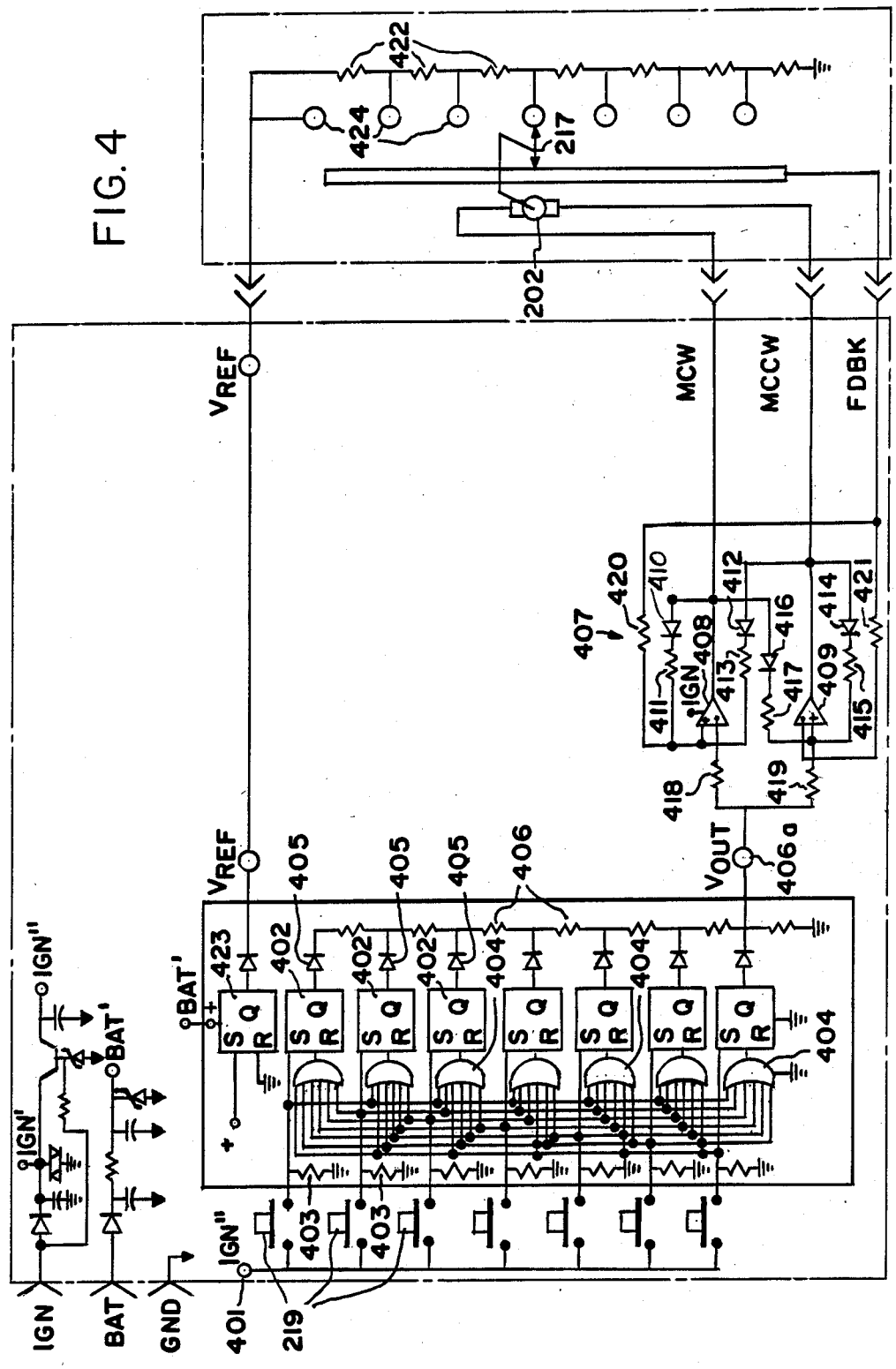
FIG. 4 is a schematic diagram of the electrical components of the invention.

With particular reference to FIG. 4, the switches 219 that interact with the climate control device 201 are comprised of normally open pushbutton switches that connect between a source of potential 401 (in this embodiment, the vehicle's battery or ignition system) and the set input of a flip-flop 402 (there being one flip-flop 402 for each switch 219). Each switch 219 also connects to an appropriate grounded resistor 403 to assure provision of an adequate voltage to the set input.

The reset input of each flip-flop 402 connects to the output of a corresponding six input OR gate 404, the inputs of which are connected to the switches 219 that are not otherwise associated with the flip-flop 402 to which the OR gate 404 is connected. In the disclosed configuration, the closing of a switch 219 will cause a set signal to be sent to the corresponding flip-flop 402, and reset signals to be sent to all of the remaining flip-flops 402. This assures that the momentary closure of any switch 219 will result in a latched input instruction signal for the flip-flop 402 that corresponds to that switch, and that all previous input instructions for other flip-flops will be erased.

The output of each flip-flop 402 is connected through a forward biased diode 405 to a resistor ladder comprised of a plurality of serially connected resistors 406. The ladder has an output 406a that connects to the input of a motor control bridge circuit 407. The output 406a of the resistor ladder will have a voltage that depends upon which switch 219 has been closed and hence which flip-flop 402 has been actuated and the number of resistors 406 that have been activated.

The control bridge circuit 407 includes two comparators 408 and 409, each of which may be an LM 272 operational amplifier or comparable part. The inverting input of the first comparator 408 is connected through a resistor 418 to the output 406a of the resistor ladder, and the output of the first comparator 408 is connected to the motor 202 to provide a drive signal thereto. The non-inverting input of the first comparator 408 is connected through a first series connected diode/resistor 410/411 to the output thereof, and through a second series connected diode/resistor 412/413 to the output of the second comparator 409.

In a somewhat similar manner, the non-inverting input of the second comparator 409 is connected through a resistor 419 to the output 406a of the resistor ladder, through a third series connected diode/resistor 414/415 to the output thereof, and through a fourth series connected diode/resistor 416/417 to the output of the first comparator 408.

In addition, a feedback signal (explained below in more detail) is provided to the non-inverting input of the first comparator 408 and to the inverting input of the second comparator 409 through resistors 420 and 421 as indicated.

The feedback signal is provided as a function of the position of the conductive contactor or slide 217 that moves in concert with the carrier assembly 204. In particular, a second resistor ladder is provided, composed of a plurality of serially connected resistors 422 coupled between ground and a source of potential. In the disclosed embodiment the source of potential comprises the diode protected Q output of a flip-flop 423 having its reset port grounded and its set port coupled to an enabling or reference potential derived from the vehicle's battery or ignition system. A conductive tap or pad 424 is provided between each resistor 422 on a circuit substrate (identified by the reference character 218 in FIG. 2) in a position to enable the conductive slide 217 to contact it when the conductive slide 217 is positioned proximal to any of such conductive pads 424. When the conductive slide 217 contacts a conductive pad 424, the conductive element 217 will provide a feedback signal from the conductive pad to the bridge circuit 407. The voltage level of the feedback signal will be proportional to which conductive pad 424 has been contacted and, consequently, the number of resistors 422 activated.

Energization of the motor 202 is initiated by the momentary actuation of a pushbutton switch 219. The voltage at the output 406a will be determined by which one of the switches 219 is actuated. Thus, if the fourth or middle switch 219 is actuated, the voltage produced at the output 406a will be different from that produced by the actuation of any other of the switches, and vice versa.

Voltage produced at the output 406a will be transmitted as a command signal to the positive terminal of the comparator 408 and to the negative terminal of the comparator 409. The feedback voltage is transmitted to the negative terminal of the comparator 408 and the positive terminal of comparator 409. If the command signal voltage and the feedback voltage are equal, the inputs to the comparators are equal, the bridge circuit 407 is balanced, and no differential voltage is applied to the motor 202. Consequently, the motor is not energized. This condition results unless the switch 219 actuated is different from that which was last activated.

If the command signal voltage, generated as a result of actuation of a pushbutton switch 219 other than that which was last activated, is greater than the feedback signal voltage, the voltage at the positive terminal of the comparator 408 will be higher than that at the negative terminal, and the voltage values at the positive and negative terminals of the comparator 409 will be the opposite. The output from the comparator 408 will be high, compared to the output of the comparator 409, and a differential voltage will be applied to the motor 202. The motor thus will be energized and its armature shaft will be driven in one direction. The carrier 204 will be driven in a corresponding direction, thereby effecting concurrent movement of the valve 213, the slide 217, and the contact plate 301. As the slide 217 moves along the feedback resistor ladder from tap to tap, the feedback voltage applied to the control bridge 407 changes so as to decrease the differential between the command signal and feedback voltages.

When the feedback voltage nearly equals the command signal voltage, the input to the comparator 409 forces it to switch to high. Since both comparators' outputs then are the same, no voltage is applied to the motor 202 and it is deenergized.

The operation of the control bridge is opposite that just described if the activated switch 219 produces a command signal voltage having a value lower than that of the feedback voltage.

The resistor diode combinations from output to input form an acceptance window which can be modified to accommodate the expected tolerances applicable to the resistor ladders. This eliminates having to match exactly the resistor ladders' output voltages. They also provide hysteresis for clean on-off switching of the comparators.

Those skilled in the art will appreciate that various enhancements and modifications may be made to the disclosed embodiment without departing from the scope of the invention. For example, the switch latching and feedback control functions could be accomplished through other circuit embodiments, including microprocessor based embodiments. The claims therefore should not be considered as being limited to the precise embodiments described in the absence of specific limitations directed to such embodiments.

We claim:

1. In a pneumatic vehicle climate control system having a plurality of spaced apart pneumatic ports one of which leads to a pneumatic source and each of the others of which leads to a specific pneumatically operable device, a movable carrier, and valve means carried by said carrier and operable in response to movement thereof to couple and uncouple selected ports to and from one another, the improvement comprising an electrical driving motor; drive transmitting means coupling said motor and said carrier for moving the latter in response to energization of said motor; motor control circuit means for energizing and deenergizing said driving motor; input means coupling said circuit means to an energy source for energizing said motor; and feedback means coupled to said energy source and said control circuit means and being operable to deenergize said motor in response to movement of said carrier and said valve means to a selected position with respect to said ports, said feedback means including a conductive member carried by said carrier for sliding engagement with a resistor ladder.

2. The system of claim 1 wherein said motor comprises a reversible DC motor.

3. The system of claim 1 wherein said resistor ladder has a plurality of conductive taps each of which is engageable successively by said conductive member in response to movement thereof by said carrier.

4. The system of claim 3 wherein said motor is reversible and the direction in which said motor is driven in response to energization thereof depends upon the energy values delivered to said control circuit by said input means and said feedback means.

5. The system of claim 1 wherein said input means includes a plurality of normally open switches.

6. The system of claim 5 including means for releasably latching a selected one of said switches in closed position.

7. The system of claim 6 including means responsive to closure of any of said switches for effecting unlatching of all previously closed switches.

8. The system of claim 6 wherein said latching means comprises a flip-flop.

9. In a pneumatic vehicle climate control system having a plurality of spaced air ports, a movable carrier, and a valve member carried by said carrier for movements therewith to couple and uncouple selected ports to and from one another, the improvement comprising a control circuit; an electric motor; transmission means coupling said motor and said carrier for moving the latter in response to energization of said motor; input means for coupling said control circuit to a source of electrical energy; means for coupling said control circuit to said motor to supply said motor with energy at one potential; feedback means; means coupling said feedback means to a source of electrical energy; means coupling said feedback means and said control circuit for supplying energy to said control circuit at a potential different from said one potential; and contact means carried by said carrier in engagement with said feedback means and being operable in response to movement of said valve member a selected distance to equalize said potentials and deenergize said motor.

10. The system of claim 9 wherein said motor is reversible.

11. The system of claim 9 wherein said feedback means comprises a resistive ladder having a plurality of taps engageable successively by said contact means.

12. The system of claim 9 wherein said motor is reversible and wherein the direction in which said motor is driven depends upon the values of the potentials delivered to said control circuit by said input means and by said feedback means.

13. The system of claim 9 wherein said input means includes a plurality of normally open switches.

14. The system of claim 3 including means for releasably latching a selected one of said switches in closed position.

15. The system of claim 14 including means responsive to closure of any of said switches for effecting unlatching of all previously closed switches.

16. The system of claim 15 wherein said latching means comprises a flip-flop.

17. The system of claim 14 including switch means supported by said carrier for movements therewith and engageable with electrical contacts for operating devices for conditioning air.

* * * * *

UNITED STATES PATENT AND TRADEMARK OFFICE
CERTIFICATE OF CORRECTION

PATENT NO. : 4,907,490

DATED : March 13, 1990

INVENTOR(S) : David W. Taylor et al

It is certified that error appears in the above-identified patent and that said Letters Patent is hereby corrected as shown below:

In column 3, line 22, change "convenienr" to -- convenient --.

In column 8, line 13, change "3" to -- 13 --.

In column 8, line 19, change "15" to -- 14 --.

Signed and Sealed this

Sixteenth Day of April, 1991

Attest:

HARRY F. MANBECK, JR.

Attesting Officer

Commissioner of Patents and Trademarks